United States Patent [19]

Desserre

[11] Patent Number: 4,737,873

[45] Date of Patent: Apr. 12, 1988

[54] MAGNETIC WRITING TRANSDUCER FOR TRANSVERSE RECORDING

[75] Inventor: Jacques Desserre, Paris, France

[73] Assignee: Bull, S.A., Paris, France

[21] Appl. No.: 811,748

[22] Filed: Dec. 20, 1985

[30] Foreign Application Priority Data

Dec. 20, 1984 [FR] France ............................... 84 19512

[51] Int. Cl.⁴ ............................................. G11B 5/265
[52] U.S. Cl. .................................... 360/121; 360/123
[58] Field of Search ................................ 360/121, 123

[56] References Cited

U.S. PATENT DOCUMENTS 3,092,815 6/1963 Hinze ............................. 360/121 X

FOREIGN PATENT DOCUMENTS 1270657 6/1968 Fed. Rep. of Germany .

*Primary Examiner*—A. J. Heinz
*Attorney, Agent, or Firm*—Kerkam, Stowell, Kondracki & Clarke

[57] ABSTRACT

A magnetic transducer is proposed for transverse recording on at least one track (PI$_1$) of a data carrier (SMI$_1$), comprising a magnetic circuit embodied by at least one writing pole (DCI$_1$) coupled with a coil (BOBI$_1$). According to the invention, the writing pole is a central pole surrounded by two auxiliary lateral poles (PLI$_{1.1}$ and PLI$_{1.2}$), separated from each of them by an air gap (ENI$_1$, ENI$_2$) such that the central pole records each cell of a given track with a given direction of magnetization, and the auxiliary poles record, on both sides of this cell, two lateral cells the magnetization of which is parallel and in the same direction and is opposite that of the central cell. The invention is applicable to magnetic disks.

8 Claims, 6 Drawing Sheets

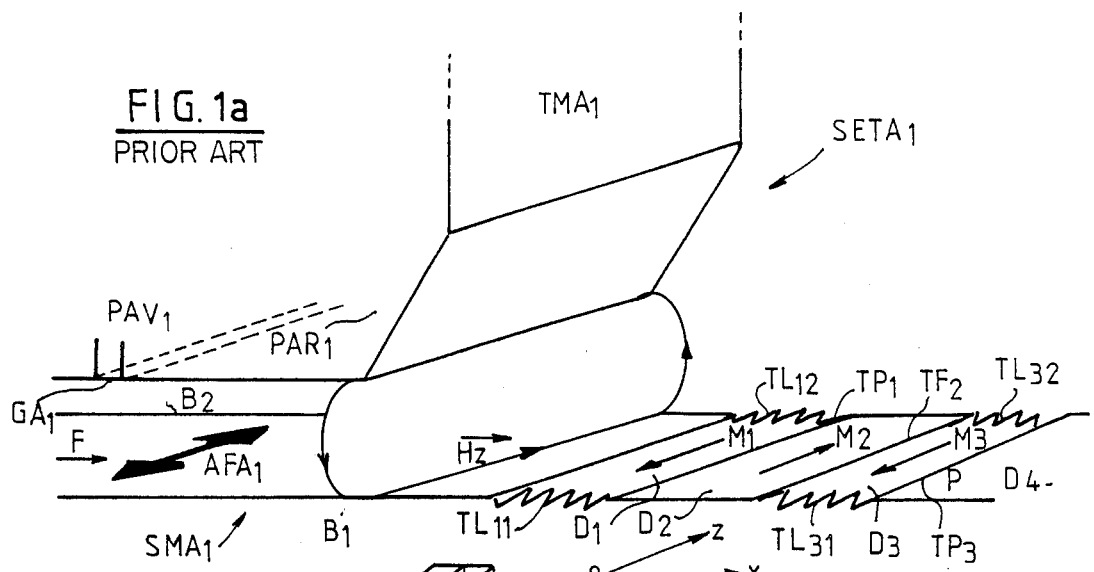
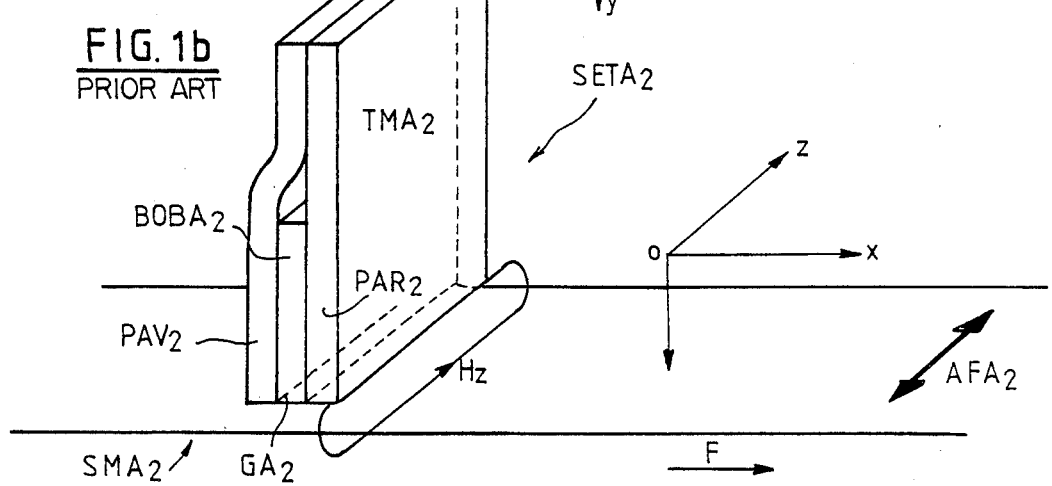
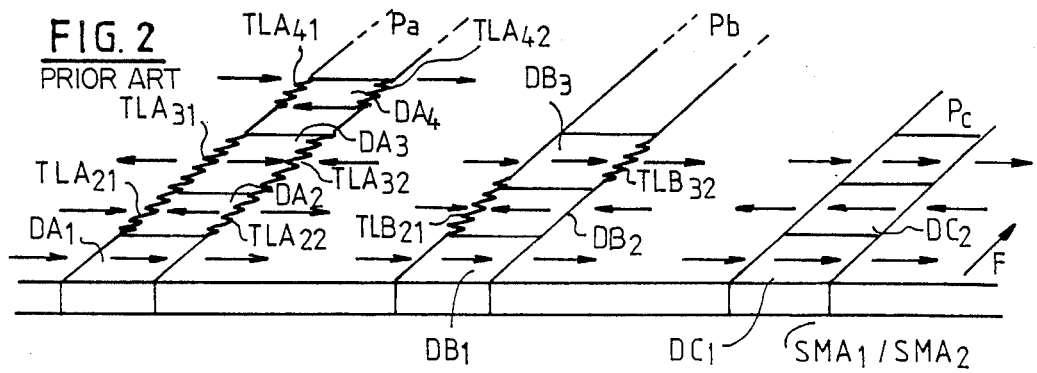

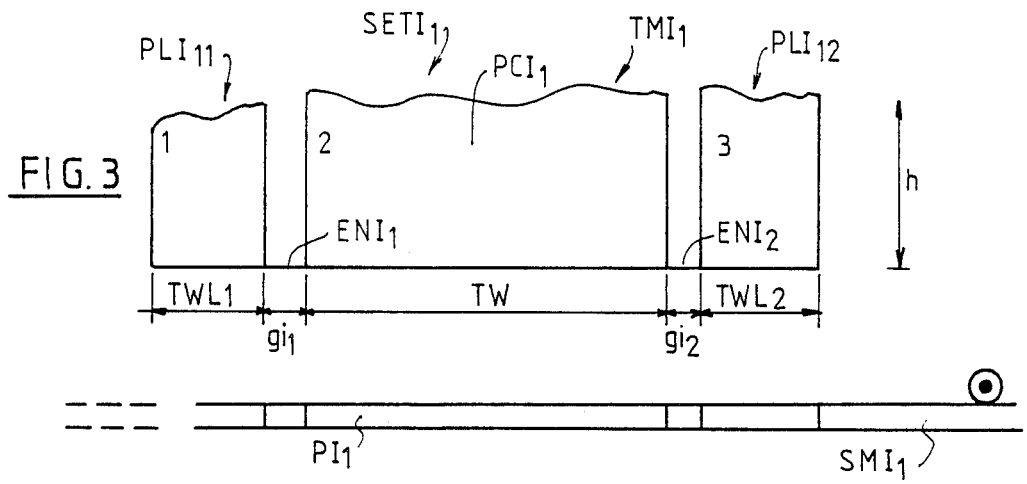
FIG. 3
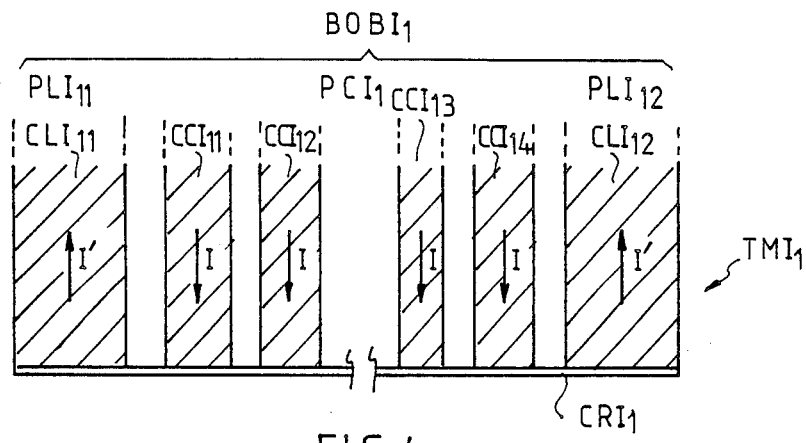
FIG. 4a
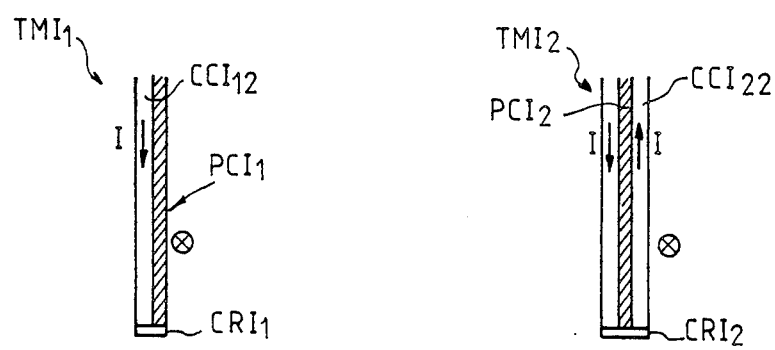
FIG. 4b
FIG. 4c

MAGNETIC WRITING TRANSDUCER FOR TRANSVERSE RECORDING

FIELD OF THE INVENTION

The present invention relates to a magnetic writing transducer for transverse recording. It is applicable in particular to high density linear and radial recording of data onto the magnetic disks of disk memories.

BACKGROUND OF THE INVENTION

Magnetic disks contain data written inside concentric circular tracks. They take the form of a succession of small magnetic cells, having a generally variable length, distributed over the entire length of each track. The magnetization in two consecutive elementary magnetic cells is in opposite directions and generally has the same modulus.

The means which enables data to be either written on the magnetic disks or read therefrom, or which enables both of these functions to be realized, is known as a transducer.

Magnetic transducers comprising a magnetic circuit and a winding around said circuit are disposed are commonly used for both writing and reading. The magnetic circuit generally includes two pole pieces separated by an air gap. This circuit is placed a very slight distance (between 0 and a few tenths of a micron) away from the face of a magnetic data carrier. The pole piece that is chronologically the first one to have the data on the magnetic data carrier rotate past it is called the upstream, or front, pole piece, while the other pole piece is called the downstream, or rear, pole piece.

The trend in present-day development of magnetic disks is to seek ways of attaining radial densities of several thousand tracks per centimeter (measured along the diameter of the disks), and linear densities equal to or greater than 10,000 changes in magnetization direction per centimeter (measured along the circumference of the tracks).

One of the methods of writing data that enables such recording densities to be attained is known as transverse writing. In this method, the magnetization in the elementary cells is located in the plane of the magnetic recording film of the disk (that is, parallel to the disk) and perpendicular to the direction in which the data are moved in the recording process, hence the term transverse recording. In this mode, the magnetic medium comprising the film is preferably an anisotropic magnetic medium having one preferred direction of magnetization, known as the direction of easy magnetization, contained in the plane of the recording film and perpendicular to the direction in which the data are moved in the recording process. For a magnetic disk, this direction is radial in any case, and the magnetization in the cells is therefore oriented along a diameter of the disk.

Each elementary cell of a given track on the recording carrier is separated from each of its neighbors by a magnetic transition (in fact, a Bloch or Neel wall, a geometric locus of points separating two adjacent elementary cells of opposite magnetization, indicating the reversal of the direction of magnetization between these cells), which is known as the principal transition. Said principal transition is oriented along a diameter of the disk, perpendicular to the direction in which the data rotate. On the data carrier, each principal transition physically defines a binary datum.

More generally, a magnetic transition is defined as the geographic border between magnetic cells of opposite magnetization.

To write data using the transverse writing method, a recording system comprising a magnetic transducer is typically used, with the air gap of its magnetic circuit aligned perpendicularly to the direction in which the data rotate and to the surface of a recording carrier of the type described above (anisotropic magnetic disk with a radial direction of easy magnetization, for example).

The magnetic writing field used is the component of the magnetic field produced by the rear pole piece, that is, the component that is parallel to the recording carrier and perpendicular to the direction in which the data rotate.

It has been found that the system and the recording method described above makes it possible to obtain magnetic transitions separating the successive magnetic cells of each track which are very precisely defined and are highly stable. It has also been found that the length of each transition (measured parallel to the direction of rotation of the data) decreases as the thickness of the recording film decreases.

In order for data recorded by the transverse method to be readable, each of the magnetic cells must emit a stray magnetic field, in the immediate vicinity of the recording carrier, of sufficient intensity that a reading transducer will furnish a signal that is usable by the electronic reading circuits associated with it.

By the nature of transverse recording, however, there is no stray magnetic field produced vertically, with respect to the principal transitions, in the vicinity of the surface of the data carrier. Indeed, the lines of the magnetic field between two adjacent cells about these transitions have the tendency to close within the same plane as the data carrier, rather than outside it.

In order for the magnetic cells of a track to produce a stray magnetic field in the vicinity of the surface of the data carrier making it possible to detect its location, each of these cells must include a lateral transition on each of its sides, that is, transitions parallel to the direction in which the data rotate. This means that a cell of a given track must be surrounded, on both sides of the track, by magnetic cells which possess magnetization opposite to that of the cell in question.

In other words, only the magnetic cells that are provided with two lateral transitions, arranged in the way described above, will produce, in the immediate vicinity of the recording carrier, a stray magnetic field having sufficient intensity to produce a reading signal that is usable by the terminals of a magnetoresistant reading transducer.

Thus, for the magnetic cells of a given track, it is the principal transitions that make it possible to define the geographic location of the binary data on the disk, and it is the lateral transitions that enable these data to be detected by a reading transductor.

The disadvantage of the system and of the typical recording methods described above is that mapping the stray magnetic field generated by the recorded data is heavily dependent on the initial magnetic state of the track to be used for recording, and of its immediate magnetic environment (this term being defined as a zone of limited size which is located on both sides of the edges of the track).

In fact, the initial magnetic state of the track and its immediate magnetic environment is quite random, which may have one of the following consequences:

(a) a recorded magnetic cell is provided with a lateral transition on each of its sides that are parallel to the direction of data rotation, in which case the output signal of the reading transducer is usable;

(b) the recorded magnetic cell is provided with a lateral transition on only one of its sides, in which case the stray magnetic field that is produced is relatively weak, and the output signal of the magnetoresistive reading transducer is weak, therefore, hard to use;

(c) the recorded magnetic domain does not include lateral transitions on either side in which case the stray magnetic field that is produced is virtually zero, and the output signal of the magnetoresistant reading transducer is accordingly zero as well.

The set of reading signals to be read corresponding to a given track will accordingly include two types of signals:

(1) signals having enough amplitude that they enable a determination of the value of the corresponding data (i.e., case above);

(2) signals with weak or even zero amplitude, making it either uncertain or impossible to determine the value of the corresponding data (cases (b) and (c) above). The signal corresponding to the set of recorded magnetic domains on a given track will, therefore, be extremely difficult to use.

OBJECT AND SUMMARY OF THE INVENTION

The present invention makes it possible to overcome this disadvantage, by proposing a magnetic recording transducer that includes a central writing pole surrounded by two auxiliary lateral writing poles and separated from each of said lateral poles by an air gap, such that the central pole records a central cell of a given track with a given direction of magnetization, while the auxiliary poles record on both sides of this cell; magnetizing two lateral cells in the direction opposite that of the central cell.

The air gaps between the central pole and the two auxiliary lateral poles make it possible to produce lateral magnetic transitions for each central cell, which makes the data recorded on each track usable at any time by the reading transducers and their associated electronic reading circuits.

The invention, a magnetic transducer for transverse recording of data onto a plurality of tracks of a data carrier, the data of each track being in the form of a plurality of magnetic cells having vectors of magnetization contained in the plane of the data carrier, and perpendicular to the direction of rotation of the data carrier, comprising:

a magnetic circuit including at least one writing pole, magnetically coupled with a coil, the writing pole comprising a central writing pole surrounded by auxiliary lateral writing poles, being separated from each of said lateral poles by an air gap, such that the central pole records a central cell of a given track with a given direction of magnetization, while the auxiliary lateral poles record two lateral cells, on both sides of this domain, of which the magnetization has the same value and the same direction and is opposite to that of the cell that is recorded by the central pole, the two air gaps thus producing two lateral magnetic transitions, on both sides of each central cell of one track, which are parallel to the direction of rotation of the data carrier.

The invention also relates to a method of transverse recording of data onto a plurality of tracks of a data carrier, the data of each track being in the form of a succession of elementary central cells, having vectors of magnetization contained in the plane of the data carrier and perpendicular to the direction of rotation of the data. The principal characteristic of this method of transverse recording comprises recording two lateral cells, on both sides of each central cell of a given track, having the same magnitude of magnetization and in the direction opposite that of the recorded central cell on the track, the boundary between each lateral cell and the central cell defining a lateral magnetic transition parallel to the direction of rotation of the data.

Preferably, the data carrier has in its plane an axis of easy magnetization that is perpendicular to the direction in which the data rotate.

Other characteristics and advantages of the present invention will become apparent from the ensuing description, given by way of a purely illustrative and non-limiting example, taken in conjunction with the drawings.

BRIEF DESCRIPTION OF THE DRAWINGS

FIG. 1 comprising FIGS. 1a and 1b, shows, in the form of a simplified schematic view, a system of transverse recording according to the prior art as in French Pat. No. 2.068.884 and corresponding U.S. Pat. No. 3,611,417.

FIG. 1a shows a recording system where the transducer is a magnetic transducer of the standard ferrite type;

FIG. 1b shows a recording system where the magnetic recording transducer is an integrated transducer;

FIG. 2 shows the disadvantages of the transversal recording system according to the prior art shown in FIG. 1;

FIG. 3 is a schematic, simplified front view, along a direction parallel to the direction of rotation of the data, of a magnetic transducer for transverse recording according to the invention;

FIG. 4, comprising FIGS. 4a, 4b and 4c, shows how the various conductors comprising the coil of the magnetic transducer for transverse recording according to the invention and as shown in FIG. 3 can be arranged;

FIG. 4a is a front view taken along a direction parallel to the direction of rotation of the data;

FIGS. 4b and 4c are sectional view, in a plane that is perpendicular to the recording carrier and parallel to the direction of rotation of the data, of a coil for the transducer for transverse recording according to the invention;

FIG. 7 comprising FIG. 8, comprising

DESCRIPTION OF THE PREFERRED EMBODIMENT

Figure 5:
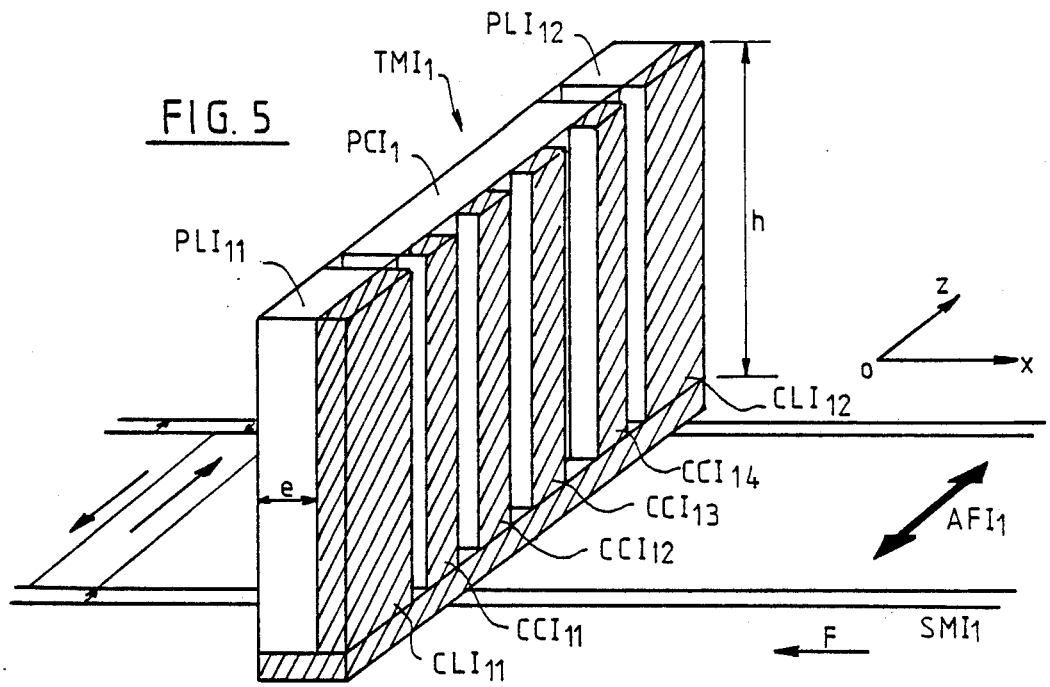
FIGS. 5 and 6 are three-quarter perspective views of a preferred embodiment of a magnetic transducer for transverse recording according to the invention, in which FIG. 5, more particularly, shows the relative disposition of the coil with respect to the central and lateral poles of the transducer according to the invention and FIG. 6, more particularly, shows the relative disposition of the central and lateral poles with respect to one another.

For better comprehension of how the magnetic writing transducer described in the invention is structured and functions, it will be useful to consider the structure and function of magnetic transducers for transverse writing of data according to the prior art, and to consider their disadvantages. These aspects are illustrated by FIGS. 1a, 1b and 2. FIGS. 1a and 1b show two systems of transverse recording incorporating two magnetic transducers according to the prior art, and FIG. 2 shows the disadvantages of such recording systems.

Turning now to the drawings, FIG. 1a shows a transverse recording system $SETA_1$ according to the prior art.

This system $SETA_1$ includes the following:

a magnetic transducer $TMA_1$ and a recording carrier $SMA_1$, which rotates past the transducer $TMA_1$ in the direction indicated by the arrow F.

The transducer $TMA_1$ shown in FIG. 1a is of the standard type, for instance embodied in ferrite, and it includes a front pole $PAV_1$ and a rear pole $PAR_1$, which are separated by an air gap $GA_1$.

The recording carrier $SMA_1$, of which only one track P is shown, is embodied in an anisotropic material which has a direction of easy magnetization $AFA_1$ perpendicular to the direction of rotation or movement F of the data and contained within the plane of the recording carrier $SMA_1$. The thickness of the magnetic film on the recording carrier is very slight, on the approximate order of 200 Å to 1 micron.

To produce the data on the track P, a succession of magnetic cells is recorded by means of the rear pole $PAR_1$ of the transducer $TMA_1$, with the aid of the field component $H_z$ produced by the rear pole ($PAR_1$) (the recording system $SETA_1$ is lined up according to a system of rectangular axes Ox, Oy, Oz, as shown in FIGS. 1a and 1b). For the sake of simplicity, only three of these magnetic cells, $D_1$, $D_2$ and $D_3$, are shown in FIG. 1a. The magnetization within each of these cells is represented by the vectors $M_1$, $M_2$ and $M_3$, and is transverse, that is, perpendicular to the direction of rotation or movement F of the data (perpendicular to the axis Ox) and parallel to the axis Oz. If the recording carrier is a magnetic disk, then the magnetization in each of these recorded magnetic cells such as $D_1$–$D_3$ is radial.

Each cell $D_1$–$D_3$ is separated from the one adjacent it by a principal transition which is perpendicular to the direction of rotation F. The principal transition $TP_1$ divides $D_1$ and $D_2$; the transition $TP_2$ divides $D_2$ and $D_3$; and the transition $TP_3$ divides $D_3$ and $D_4$. It is these principal transitions that define the geographic location of the binary information on the track P of the disk.

If the magnetic state of the surroundings of the track P, located on both sides of the edges $B_1$ and $B_2$ of this track, is such that the magnetization is opposite that of the recorded magnetic cells on the track P, then these cells have lateral transitions disposed on the edges $B_1$ and $B_2$; these transitions are $TL_{11}$ and $TL_{12}$ for the cell $D_1$, and $TL_{31}$ and $TL_{32}$ for the cell $D_3$.

By experimentation one observes that the lateral transitions take the form of sawteeth, which have an axis of symmetry coinciding with the edges $B_1$ and $B_2$ of the track P.

FIG. 1b shows a transverse system $SETA_2$ according to the prior art, which includes the following:

an integrated magnetic transducer $TM_2$, and a recording carrier $SMA_2$.

The magnetic transducer $SMA_2$ is of the integrated type, such as that described in French patent No. 2.063.693, filed by the Compagnie Internationale pour l'Informatique and the Commissariat a l'Energie Atomique on Oct. 28, 1969 and entitled (in translation) "Integrated Magnetic Head and Method for Its Manufacture", and French patent No. 2.209.154, filed by the Compagnie Internationale pour l'Informatique on July 3, 1972 and entitled (in translation), "Improved Magnetic Transducors and Method for Their Manufacture".

This transducer accordingly includes a front pole $PAV_2$ and a rear pole $PAR_2$, with a coil $BOBA_2$ positioned between them. The transducer $TMA_2$ includes an air gap $GA_2$. The two poles $PAV_2$ and $PAR_2$ are embodied as thin magnetic films, while the coil $BOBA_2$ is embodied as a stack of thin conducting and insulating films.

The recording carrier $SMA_2$ is entirely identical to the recording carrier $SMA_1$ and has an axis of easy magnetization that is perpendicular to the direction of rotation F of the data and parallel to the axis Oz.

As in the case of the transducer $TMA_1$, the magnetic cells having transverse magnetization are recorded with the aid of the component $H_z$ produced by the rear pole $PAR_2$ of the transducer $TMA_2$.

Thus as noted above, only those magnetic cells such as $D_1$ and $D_3$ which on each side, coinciding with the edges of the track P, are provided with a lateral transition—($TL_{11}$) –$TL_{12}$ for the cell $D_1$ and $TL_{31}$–$TL_{32}$ for the cell $D_3$)—produce a stray magnetic field $H_f$ strong enough that it will be detected by a reading transducer; the principal transitions such as $TP_1$, $TP_2$, $TP_3$ do not produce a stray field in the vicinity of the carrier. Thus it will be appreciated that although the principal transitions define the geographic location of the data, it is the lateral transitions that make it possible for the data to be detected.

The recording system $SETA_1$ (or $SETA_2$) thus has the following disadvantages, illustrated particularly in FIG. 2, which shows three tracks $P_a$, $P_b$ and $P_c$ of a magnetic recording carrier such as $SMA_1$ or $SMA_2$; the magnetic environment of these tracks is entirely arbitrary (as is the case in actual practice).

The existence or absence of lateral transitions is highly dependent on the prior magnetic state of the recording carrier. As this state is entirely random, the magnetic cells having transverse magnetization which have been recorded by set $_1$ (or $SETA_2$) may or may not have lateral transitions.

If one observes track $P_a$, one sees that the cell $DA_1$ does not include a lateral transition, while the cell $DA_2$ includes two lateral transitions, $TLA_{21}$ and $TLA_{22}$, the cell $DA_3$ includes two lateral transitions, $TLA_3$ and $TLA_{32}$, and the cell $DA_4$ has lateral transitions $TLA_{41}$ and $TLA_{42}$, which occupy only half the length of the cell (the length is the dimension of the cell measured parallel to the direction of rotation F of the data).

One also sees that for the track $P_b$, the cell $DB_1$ does not have any lateral transition, while the cell $DB_2$ includes a single lateral transition $TLB_{21}$, over only half the length of this cell, and finally the cell $DB_3$ includes only one lateral transition, $TLB_{32}$, over only half the length of that cell.

One then observes that none of the cells $DC_1$, $DC_2$, etc. of the track $P_c$ includes any lateral transition.

One then sees that for track $P_c$, for example, none of the cells shown in FIG. 2 will produce a stray magnetic field.

As for track $P_b$, it will be extremely difficult to use its data; in fact, it will be impossible for cell $DB_1$.

As for track $P_a$, the only data that can be used correctly will be that comprising cells $DA_2$ and $DA_3$.

The transducer $TMI_1$ according to the invention, which is illustrated in FIGS. 3-6, overcomes the above disadvantages. It includes the following:

a central pole $PCI_1$;
two auxiliary lateral poles $PLI_{11}$ and $PLI_{12}$; and
a coil $BOBI_1$.

The transducer $TMI_1$ includes a first air gap $ENI_1$ between the central pole $PCI_1$ and the auxiliary lateral pole $PLI_{11}$, and a second air gap $ENI_2$ between the central pole $PCI_1$ and the auxiliary lateral pole $PLI_{12}$.

The transducer $TMI_1$ is associated with a recording carrier $SMI_1$ analogous to the carriers $SMA_1$ and $SMA_2$ (which are presumed to be disks). This produces a system of transverse recording according to the invention $SETI_1$.

This system records data onto tracks such as $PI_1$ (see FIGS. 3, 7a, 7b) of this recording carrier.

In FIG. 3, the recording carrier $SMI_1$ is shown rotating at right angles to the plane of the drawing. The symbols $TW_{L1}$, $TW$, $TW_{L2}$, $gi_1$, $gi_2$ indicate the widths of the auxiliary lateral pole $PLI_{11}$, the central pole $PCI_1$, the auxiliary lateral pole $PLI_{12}$ (with $TW_{L1}$, $TW$ and $TW_{L2}$), and the air gap $ENI_1$ and the air gap $ENI_2$ (with $gi_1$ $gi_2$), respectively. The symbol e represents the thickness of the transducer, measured parallel to the direction of rotation of the data, and the symbol h indicates its height, measured perpendicular to the recording carrier.

It is clear that the smaller the dimensions $TW_{L1}$, $gi_1$, $TW$, $gi_2$ and $TW_{L2}$ are, the greater the radial density of the recorded data will be.

Also, the smaller the thickness e of the transducer, the more it becomes possible to attain high longitudinal density of the data.

FIGS. 4a, 4b, 5 and 6 show a first preferred embodiment $TMI_1$ of the transducer according to the invention, while FIG. 4c shows a second preferred embodiment $TMI_2$ of the magnetic transducer for transverse recording according to the invention.

Figure 6:
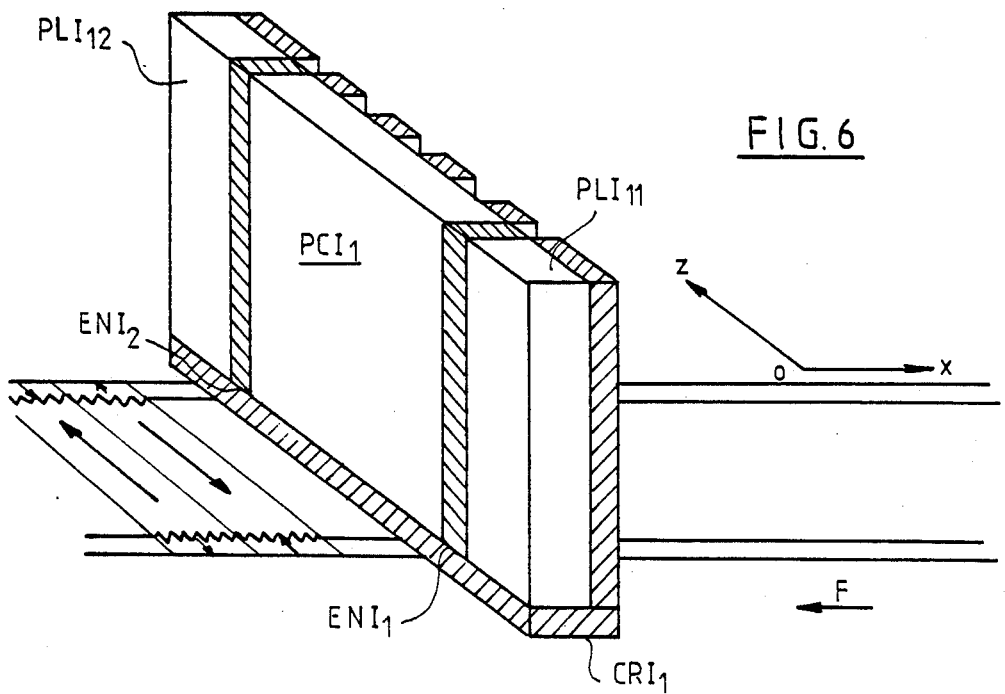

As seen in FIGS. 4a, 4b, 5 and 6, the coil $BOBI_1$ includes, first, central conductors disposed about the central pole $PCI_1$—that is, the conductors $CCI_{11}$, $CCI_{12}$, $CCI_{13}$, $CCI_{14}$ (in this case, n thus equals 4)—and, second, two lateral conductors $CLI_{11}$ and $CLI_{12}$, disposed on the auxiliary lateral poles $PLI_{11}$ and $PLI_{12}$, respectively. These conductors are perpendicular to the recording carrier and are disposed on the one of the faces of the poles that is perpendicular to the direction of rotation. A nonmagnetic and electrically insulating film, not shown in order to simplify FIGS. 4-6, is disposed between the conductors and the central and lateral poles. It is preferable to have a plurality of central conductors instead of only one, because it is then possible to make the magnetization in the interior of the central pole homogeneous over its entire length TW, and thus to make the magnetic excitation field produced by this pole in the vicinity thereof homogeneous as well. The central conductor $CCI_{11}$ through $CCI_{14}$ are equidistant from one another and preferably have the same width and the same thickness (and hence the same cross section). They are supplied with electricity in parallel.

The lateral conductors $CLI_{11}$ and $CLI_{12}$, such as those shown in FIGS. 4a, 5 and 6, have the same width (that is, $TW_{L1}$) as the lateral poles, but obviously they may also be smaller. Furthermore, the coil $BOBI_1$ includes a return conductor $CRI_1$ which is common to both the central and the lateral conductors. This return conductor is disposed on the lower potion of the transducer and hence is placed facing the recording carrier. The cross section of this return conductor is such that the field created by it is minimal, so as to offer as little perturbation as possible of the writing field. In the first embodimen (transducer $TMI_1$), it is noted that the four central conductors and the two lateral conductors are disposed on the same side of the three poles of the transducer $TMI_1$, that is, on the same face that is perpendicular to the direction of rotation and to the recording carrier.

Alternatively, according to the second embodiment (transducer $TMI_2$), each of the faces of the central and lateral poles that are perpendicular to the direction of rotation and to the recording carrier include central and lateral conductors disposed identically on each face, analogous to the arrangement used for the transducer $TMI_1$.

The central conductors and the lateral conductors, are electrically connected in parallel.

Preferably both the transducer $TMI_1$ and the transducer $TMI_2$ are integrated transducers, and can be manufactured by the methods used especially in making semiconductors.

Figure 7A:
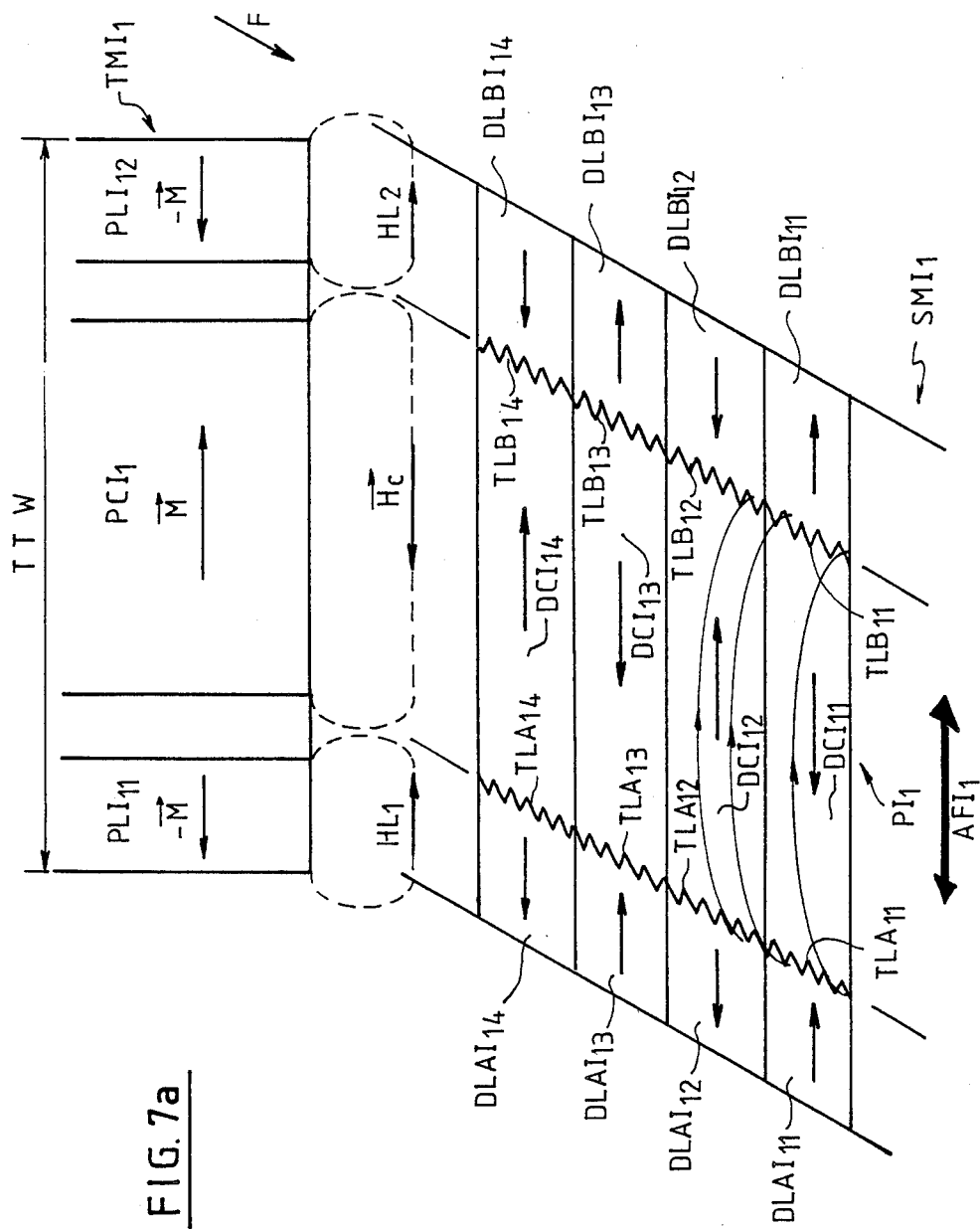
FIGS. 7a and 7b, shows how data are recorded onto a recording carrier by the magnetic transducer according to the invention as shown in FIGS. 3-6.
Figure 7B:
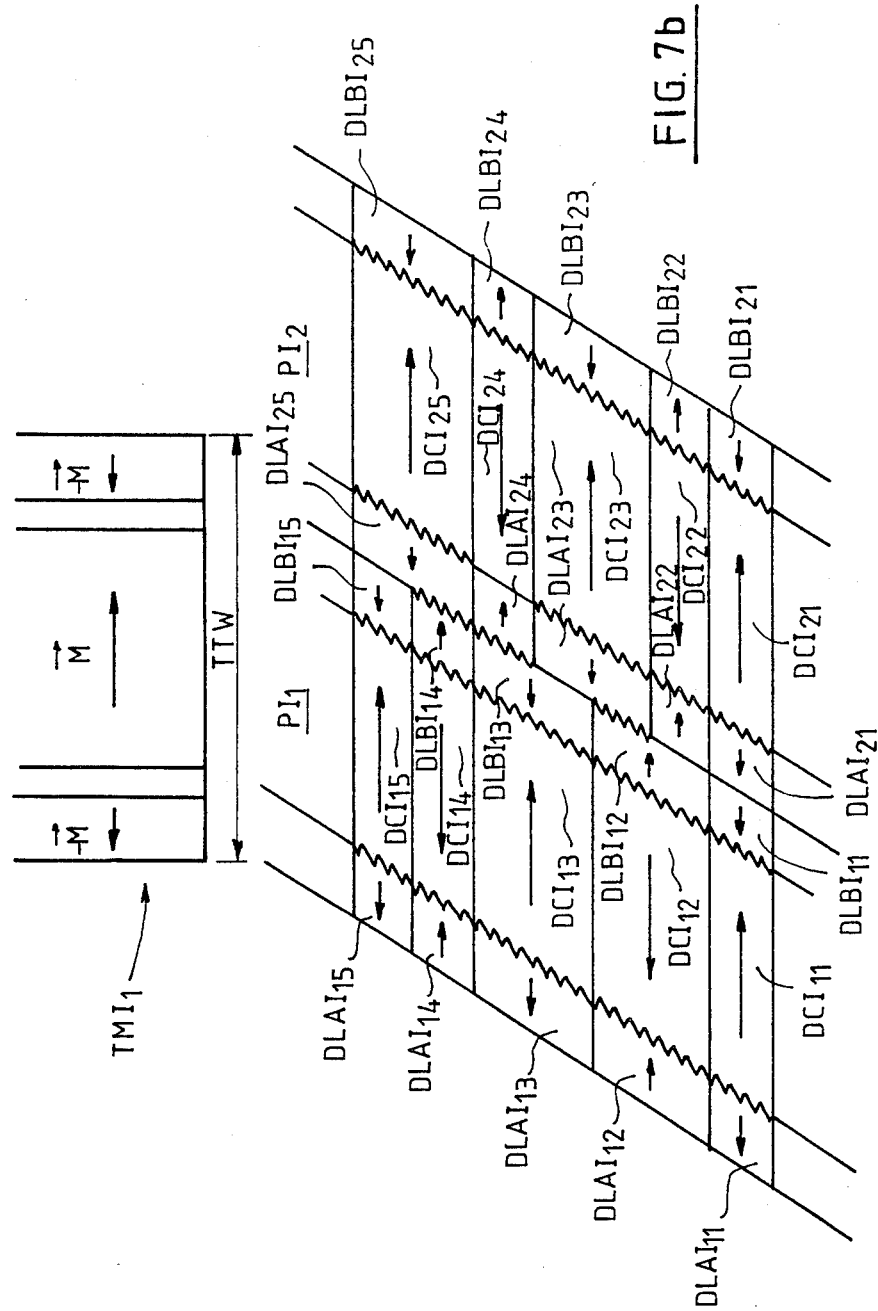

The function of the transducer according to the invention will be better understood with reference to FIGS. 7a and 7b.

The four central conductors $CCI_{11}$-$CCI_{14}$ are supplied with a current I circulating in the direction indicated in FIG. 4a; the two lateral conductors $CLI_{11}$ and $CLI_{12}$ are supplied with a current I' in the direction opposite that of current I (in practical terms, $I' = -2I$). In this manner, the magnetization in the central pole $PCI_1$ is indicated by the vector M (see FIGS. 7a and 7b), while the magnetization in the auxiliary lateral poles is indicated by the vector $-M'$ (in practical terms $M' = M$). Thus one sees that the magnetization in the central pole, on the one hand, and in the two auxiliary lateral poles, on the other, is anti-parallel. The magnetic field produced by the central pole $PCI_1$ at the level of the recording carrier $SMI_1$ is Hc (see FIG. 7a), while the magnetic fields produced by the lateral poles $PLI_{11}$ and $PLI_{12}$, respectively, are $H_{L1}$ and $H_{L2}$. The field $H_c$ on the one hand and the lateral fields $H_{L1}$ and $H_{L2}$ on the other are anti-parallel.

The transducer $TMI_1$ then writes the data in tracks such as $PI_1$ and $PI_2$ in the manner indicated by FIGS. 7a and 7b. The central pole $PCI_1$ writes in the central cells $DCI_{11}$, $DCI_{12}$, $DCI_{13}$, $DCI_{14}$. The auxiliary lateral pole $PLI_1$ writes in the lateral cells $DLAI_{11}$, $DLAI_{12}$, $DLAI_{13}$, $DLAI_{14}$, while the auxiliary lateral pole $PLI_{12}$ writes in the lateral cells $DLBI_{11}$, $DLBI_{12}$, $DLBI_{13}$, $DLBI_{14}$. In both FIGS. 7a and 7b, an arrow indicates the direction of the magnetization vectors in each of the central and lateral cells. Thus one sees that the magnetization in the lateral cells surrounding the same central cell is in the same direction, this direction being opposite the direction of the magnetization in the central cell. Thus the direction of magnetization is the same in the two lateral cells $DLAI_{11}$ and $DLBI_{12}$ surrounding the central cell $DCI_{11}$, and is opposite to the direction of magnetization in the central cell $DCI_{11}$. An analogous conclusion can be drawn for the lateral cells $DLAI_{11}$ and $DLBI_{12}$ and the central cell $DCI_{12}$, and so forth. One can also see that each of the central cell $DCI_{11}$–$DCI_{14}$ is sounded on each of its sides by lateral transistions of sawtooth form. The central cell $DCI_{11}$ is surrounded by the lateral transistions $TLA_{11}$ and $TLB_{11}$, the central cell $DCI_{12}$ is surrounded by the lateral sawtooth transitions $TLA_{12}$ and $TLB_{12}$, the central cell $DCI_{13}$ is surrounded by the two lateral transitions $TLA_{13}$ and $TLB_{13}$, and the central cell $DCI_{14}$ is surrounded by the two lateral transitions $TLA_{14}$ and $TLB_{14}$.

Because of these lateral transitions, each of the central cells $DCI_{14}$ will produce a stray magnetic field of sufficient intensity that a signal will be produced at the terminals of a reading transducer that is usable by the electronic reading circuits associated with this transducer. As shown in FIG. 7b, in order to write in a track $PI_2$ adjacent to the track $PI_1$, the transducer $TMI_1$ must be displaced by a length equal to its total width TTW. The track $PI_2$ includes central cells $DCI_{21}$–$DCI_{25}$. Each of the central cells is surrounded by the lateral cells $DLAI_{21}$–$DLAI_{25}$ and $DLBI_{21}$–$DLBI_{25}$. Thus each track is separated from the track adjacent to it by two sets of lateral cells. Accordingly, the track $PI_1$ is separated from the track $PI_2$ by the two sets of lateral cells $DLBI_{11}$–$DLBI_{15}$ and $DLAI_{21}$–$DLAI_{25}$. In FIG. 7b, the central cells are shown with variable lengths. It is also clear that the distribution of lateral sawtooth transitions in the two lateral sets $DLBI_{11}$–$DLAI_{21}$ through $DLBI_{15}$–$DLAI_{25}$ is entirely random.

Referring now to FIGS. 3 and 7b, it is clear that if extremely high radial density is to be obtained, first the width TW of the central pole $PCI_1$ will have to be small, and second the ratio $TW/TW_{L1}$ (and $TW/TW_{L2}$) will have to be high. If one has a maximum of $TW \simeq 2$ microns and $TW_{L1} \simeq TW_{L2} \simeq 1$ micron, and $gi_1 \simeq gi_2 \simeq 1000$ Å TTW will be approximately 4 microns, which corresponds to a minimum radial density of 2500 tracks per centimeter, which is substantially greater than the radial densities actually obtained at the present time.

Furthermore, the sets of lateral cells such as $DLBI_{11}$–$DLAI_{21}$ through $DLBI_{15}$–$DLAI_{25}$ do not generate a useful magnetic field (that is, a field relating to a datum); contrarily, they generate a parasitic magnetic field. Thus the width of these cells must be reduced as much as possible.

The width ($gi_1$, $gi_2$) of the two air gaps $ENI_1$ and $ENI_2$ also plays a role in the radial density that is obtained, because it has an influence on the width of the longitudinal sawtooth transitions. Thus it is worthwhile to attempt to reduce the width $gi_1$ and the width $gi_2$ as much as possible.

Figure 8A:
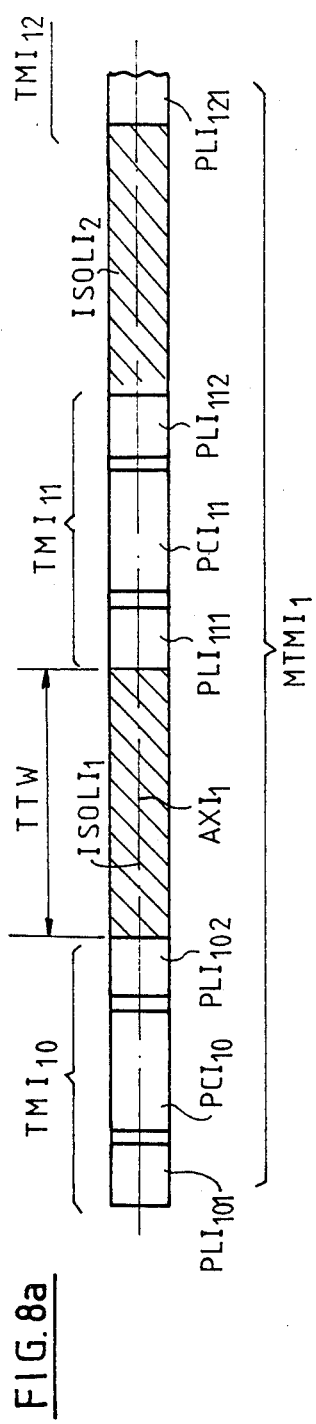
FIGS. 8a and 8b, shows top views of two writing heads including a plurality of transducers according to the invention as shown in FIGS. 3–6.
Figure 8B:
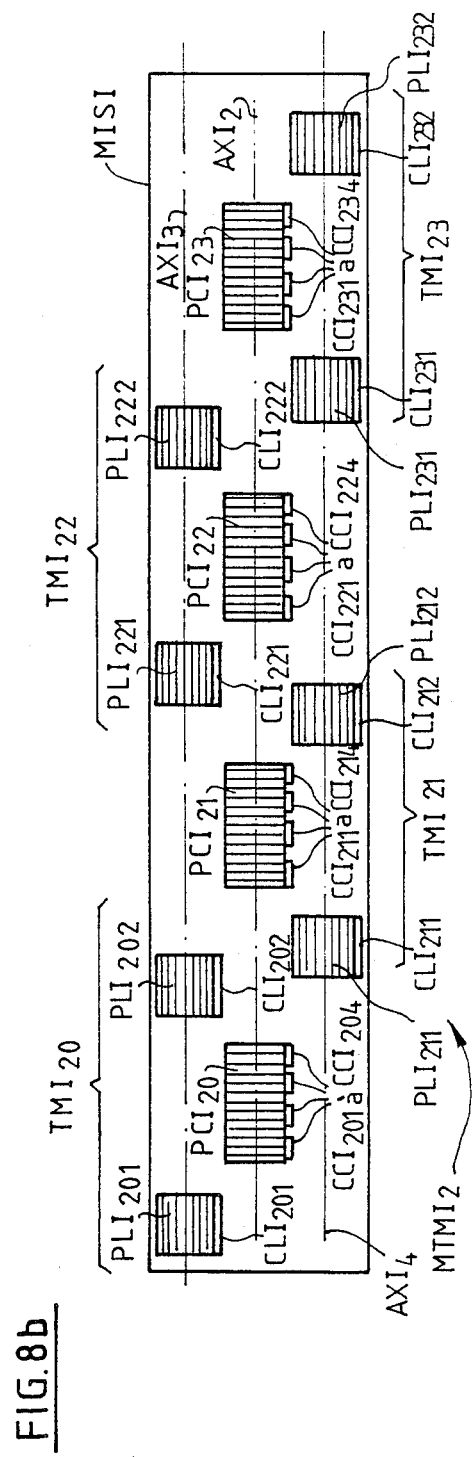

FIGS. 8a and 8b show two heads $MTMI_1$ and $MTMI_2$ which include a plurality of transducers described in the invention.

The head $MTMI_1$ shown in FIG. 8a includes a plurality of transducers, only three of which are shown in FIG. 8a. These are the three transducers, $TMI_{10}$, $TMI_{11}$ and $TMI_{12}$, which are completely identical to either transducer $TMI_1$ or transducter $TMI_2$ according to the invention. FIG. 8a is a view from above of the head $MTMI_1$. The transducer $TMI_{10}$ is shown with its central pole $PCI_{10}$ and its lateral poles $PLI_{101}$ and $PLI_{102}$; the transducer $TMI_{11}$ is shown with its central pole $PCI_{11}$ and its lateral poles $PLI_{111}$ and $PLI_{112}$; and the transducer $TMI_{12}$ is shown only with its lateral pole $PLI_{121}$. All these transducers are aligned along the axis $AXI_1$. For the sake of simplicity, the central and lateral conductors of the transducers $TMI_{10}$–$TMI_{12}$ have not been shown.

The width of each of the transducers is TTW. They are separated from one another by a nonmagnetic electrical insulator having the width TTW. Thus the transducers $TMI_{10}$ and $TMI_{11}$ are separated by the insulator $ISOLI_1$ and the transducers $TMI_{11}$ and $TMI_{12}$ are separated by the insulator $ISOLI_2$.

These insulators make it possible to avoid diaphony (interferences between the writing fields of the various transducers) completely when writing operations are performed. It will be appreciated that the multitransducer writing head $MTMI_1$ enables simultaneous writing on a plurality of tracks, each being separated by one track width, across the entire radius of the disk.

The head $MTMI_2$ shown from above in FIG. 8b includes a plurality of transducers, four of which are shown, that is, the transducers $TMI_{20}$–$TMI_{23}$.

The central poles $PCI_{20}$–$PCI_{23}$ of the transducers $TMI_{20}$–$TMI_{23}$ are identical to the central pole $PCI_1$ of the transducer $TMI_1$ (FIG. 3) and are aligned on the axis $AXI_2$.

Central flat conductors $CCI_{201}$–$CCI_{204}$ for the central pole $PCI_{20}$, $CCI_{211}$–$CCI_{214}$ for the central pole $PCI_{21}$, $CCI_{221}$–$CCI_{224}$ for the central pole $PCI_{22}$, $CCI_{231}$–$CCI_{234}$ for the central pole $PCI_{23}$, and $CCI_{241}$–$CCI_{244}$ for the central pole $PCI_{24}$ are arranged on each of the corresponding poles in the same manner as the conductors $CCI_{11}$–$CCI_{14}$ of the coil $BOBI_1$ of the transducer $TMI_1$ of the FIG. 4.

The lateral poles $PLI_{201}$–$PLI_{202}$ and $PLI_{221}$–$PLI_{222}$ of the transducers $TMI_{20}$ and $TMI_{22}$ are aligned on the same axis $AXI_3$ parallel to the axis $AXI_2$, while the lateral poles $PLI_{211}$–$PLI_{212}$ and $PLI_{231}$–$PLI_{232}$ of the transducers $TMI_{21}$ and $TMI_{23}$ are aligned on the same axis $AXI_4$ parallel to the axis $AXI_2$. Each of the lateral poles is identical to the lateral poles $PLI_{11}$ and $PLI_{12}$ of the transducer $TMI_1$. Flat lateral conductors $CLI_{201}$–$CLI_{202}$, $CLI_{212}$, $CLI_{221}$–$CLI_{222}$, $CLI_{231}$ are disposed on each of the lateral poles $PLI_{201}$–$PLI_{202}$ through $PLI_{231}$–$PLI_{232}$ in the same manner as the lateral conductors $CLI_{11}$ and $CLI_{12}$ are disposed on the lateral poles $PLI_{11}$ and $PLI_{12}$ of the transducer $TMI_1$.

The set of transducers $TMI_{20}$–$TMI_{23}$ is embedded in an insulating materal MISI.

Thus one sees that the difference between each of the transducers $TMI_{20}$–$TMI_{23}$ is the lack of alignment between their central and lateral poles, the distance between the axes $AXI_2$ and $AXI_3$, on the one hand, and axes $AXI_2$ and $AXI_4$ on the other. These distances are quite small, virtually on the order of microns, such that the functioning of each of the transducers is analogous to the functioning of the transducer $TMI_1$ (or $TMI_2$).

The lack of alignment of the central and lateral poles as well as the presence of the insulating material MISI substantially decreases the diaphony between neighboring transductors when they are writing data onto the carrier.

What is claimed is:

1. A magnetic transducer for transverse recording of data onto at least one of trackes ($PI_1$, $PI_2$) of a data carrier (SMI$_1$), the data of each track being in the form of a plurality of magnetic cells DCI$_{11}$–DCI$_{14}$ each of said magnetic cells having a magnetization vector which is substantially parallel to a plane of the data carrier (SMI$_1$) and is perpendicular to a predetermined direction of movement of the data carrier, comprising a magnetic circuit embodied by at least one writing pole (DCI$_1$) magnetically coupled with a coil (BOBI$_1$), the writing pole comprising a cental writing pole (PCI$_1$) disposed between two auxiliary lateral writing poles (PLI$_{11}$ and PLI$_{12}$), a first auxiliary writing pole being disposed on one side of the central writing pole and a second auxiliary writing pole being disposed on an opposite side, each of said lateral writing poles being separated from the central writing pole by an air gap (ENI$_1$, ENI$_2$) such that the central pole records a central cell of a given track with a given direction of magnetization, while the auxiliary lateral poles record, on both sides of sid central cell, two lateral cells of which the magnetization is parallel and in the same direction, and further is opposite to that of the central cell, the air gaps between the central pole and lateral poles producing two lateral magnetic transitions, on both sides of each central cell of one track, which are parallel to the direction of movement of the data carrier and disposed at the two ends of the central cell.

2. A transducer as defined by claim 1, wherein the transducer is of the integrated type, each of the poles being planar and perpendicular to the data carrier and to the direction of movement of the data, the magnetization in the lateral poles (PLI$_{11}$ and PLI$_{12}$), being in the same direction, and opposite that of the central (PCI$_1$).

3. A transducer as defined by claim 2, wherein the coil includes:
 (1) a plurality of central plane conductors $_{11}$–CCI$_{14}$, which are parallel to one another and perpendicular to the data carrier and to the direction of movement of the data, disposed on the central poles; and
 (2) at least one plane lateral conductor perpendicular to the data carrier and to the direction of movement of the data disposed on each lateral pole (CLI$_{11}$, CLI$_2$).

4. A method of transverse recording of data into at least one track of a data carrier (SMI$_1$), the data of each track (PI$_1$, PI$_2$) being in the form of a succession of elementary cells, each of said elementary cells having a magnetization vector which is substantially parallel to a plane of the data carrier and perpendicular to a predetermined direction of movement (F) of the data carrier, comprising using a transducer having a central writing pole and two lateral writing poles to record on a first and a second lateral side of a central cell (DCI$_{11}$ DCII$_4$) of a given track (PI$_1$, PI$_2$), two lateral cells (DLAI$_{1\text{-}1}$–DLBI$_{11}$ through DLAI$_{14}$ –DLBI$_{14}$) the magnetization of said lateral cells being parallel and in the same direction, and further being opposite that of the central cell, the boundary between each lateral cell and the central cell defining a lateral magnetic transition parallel to the direction of movement.

5. A recording method as defined by claim 4, wherein the data carrier has in its plane an axis of easy magnetization (AFI$_1$) that is perpendicular to the direction in which the data carrier moves past the transducer.

6. A system of transverse data recording comprising:
 a transducer including a magnetic circuit embodied by at least one writing pole (DCI$_1$) magnetically coupled with a coil (BOBI$_1$),
 a data carrier (SMI$_1$) having a plurality of tracks, at lest one track (PI$_1$, PI$_2$) being recorded, the data of each of the tracks being in the form of a plurality of magnetic cells (DCI$_{11}$–DCI$_{14}$), each of said magnetic cells having a magnetization vector which is substantially parallel to a plane of the data carrier (SMI$_1$) and perpendicular to a predetermined direction of movement of the data carrier (SMI$_1$), said data carrier having in its plane a direction of easy magnetization (AFI$_1$) perpendicular to the direction of movement of the writing pole is a central writing pole diposed between two auxiliary lateral writing poles (PLI$_{11}$ and PLI$_{12}$), a first auxiliary writing pole being disposed on one side of the central writing pole and a secod auxiliary writing pole being disposed on an opposite side, each of said lateral writing poles being separated from the central writing pole by an air gap (ENI$_1$, ENI$_2$) such that the central pole records an associated central cell of a given track with a given direction of magnetization, and the auxiliary poles record, on both sides of this central cell, two lateral cells of which the magnetization is parallel and in the same direction and further is opposite to that of the central cells, the two air gaps thus producing two lateral magnetic transitions, on both sides of each central cell of the given track, said transition being parallel to the direction of movement of the data and disposed at the two ends of the central cell.

7. A transducer as defined by claim 6, wherein the transducer is of the integrated type, each of the poles being planar and perpendicular to the data caerier and to the direction of movement of the data, the magnetization in the lateral poles PLI$_{11}$ and PLI$_{12}$) being in the same direction, and opposite that of the central pole (PCI$_1$).

8. A transducer as defined by claim 7, wherein the coil includes:
 (1) a plurality of central plane conductors (CCI$_{11}$–CCI$_{14}$), which are parallel to one another and perpendicular to the data carrier and to the direction of movement of the data, disposed on the central poles; and
 (2) at least one plane lateral conductor perpendicular to the data carrier and to the direction of movement of the data disposed on each lateral pole (CLI$_{11}$, CLI$_{12}$).

* * * * *

UNITED STATES PATENT AND TRADEMARK OFFICE
CERTIFICATE OF CORRECTION

PATENT NO. : 4,737,873
DATED : April 12, 1988
INVENTOR(S) : Jacques DESSERRE

It is certified that error appears in the above-identified patent and that said Letters Patent is hereby corrected as shown below:

Col. 10, line 68, "trackes" should be --tracks--.

Col. 11, line 19, "sid" should be --said--.

Col. 11, line 32, "central (PCI1)." should be --central pole ($PCI_1$).--.

Col. 11, line 35, "11-$CCI_{14}$," should be --($CCI_{11}$- $CCI_{14}$),--.

Col. 11, line 42, "$CLI1_2$" should be --$CLI_2$--.

Col. 11, line 44, "into" should be --onto--.

Col. 11, line 53, "$DCI1_4$" should be --$DCI_{14}$--.

Col. 12, line 12, "lest" should be --least--.

Col. 12, line 42, "caerier" should be --carrier--.

In the Abstract, line 7, "($PLI_{1.1}$ and $PLI_{1.2}$)" should be --($PLI_{11}$ and $PLI_{12}$)--

Signed and Sealed this

Twentieth Day of June, 1989

*Attest:*

*Attesting Officer*

DONALD J. QUIGG

*Commissioner of Patents and Trademarks*